(12) United States Patent
Morisaki

(10) Patent No.: US 10,723,344 B2
(45) Date of Patent: Jul. 28, 2020

(54) HYBRID VEHICLE AND CONTROL DEVICE MOUNTED THEREON

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 60 days.

(21) Appl. No.: 16/208,027

(22) Filed: Dec. 3, 2018

(65) Prior Publication Data

US 2019/0168736 A1 Jun. 6, 2019

(30) Foreign Application Priority Data

Dec. 5, 2017 (JP) ................. 2017-233646

(51) Int. Cl.
  *B60W 20/12* (2016.01)
  *B60W 20/13* (2016.01)
  *B60L 58/13* (2019.01)
  *B60L 50/16* (2019.01)
  *B60L 50/61* (2019.01)

(52) U.S. Cl.
  CPC ............ *B60W 20/12* (2016.01); *B60L 50/16* (2019.02); *B60L 50/61* (2019.02); *B60L 58/13* (2019.02); *B60W 20/13* (2016.01); *B60L 2240/30* (2013.01); *B60L 2240/44* (2013.01); *B60L 2240/622* (2013.01); *B60L 2240/80* (2013.01); *B60L 2260/44* (2013.01); *B60L 2260/54* (2013.01); *B60W 2710/244* (2013.01)

(58) Field of Classification Search
None
See application file for complete search history.

(56) References Cited

U.S. PATENT DOCUMENTS

| 9,126,585 | B2* | 9/2015 | Takizawa ............... B60K 6/445 |
| 2008/0262667 | A1 | 10/2008 | Otabe |
| 2017/0120888 | A1 | 5/2017 | Jinno |
| 2017/0361837 | A1* | 12/2017 | Morisaki ............... B60K 6/445 |

FOREIGN PATENT DOCUMENTS

| JP | 2008-238972 A | 10/2008 |
| JP | 2017-081416 A | 5/2017 |

* cited by examiner

*Primary Examiner* — Abdhesh K Jha
(74) *Attorney, Agent, or Firm* — Sughrue Mion, PLLC

(57) ABSTRACT

When parking is expected at a predetermined point, state of charge reduction control is performed in a current trip to control an engine and a motor, such that the state of charge of a power storage device is lower than the state of charge of the power storage device when parking is not expected at the predetermined point. State of charge recovery control is performed in a next trip to control the engine and motor, such that the state of charge is recovered during operation of the engine. When parking at the predetermined point is expected based on a destination that is estimated by a vehicle exterior system, the state of charge reduction control is performed by a first procedure. When parking at the predetermined point is expected based on a destination that is set by the user, the state of charge reduction control is performed by a second procedure.

8 Claims, 5 Drawing Sheets

HYBRID VEHICLE AND CONTROL DEVICE MOUNTED THEREON

CROSS-REFERENCE TO RELATED APPLICATIONS

The present disclosure claims priority to Japanese Patent Application No. 2017-233646 filed Dec. 5, 2017, which is incorporated herein by reference in its entirety including specification, drawings and claims.

TECHNICAL FIELD

The present disclosure relates to a hybrid vehicle and a control device mounted thereon and more specifically relates to a hybrid vehicle including an engine, a motor and a power storage device as well as to a control device mounted on such a hybrid vehicle.

BACKGROUND

A hybrid vehicle includes an engine, a motor and a battery and is configured to control the engine and the motor such that the hybrid vehicle is driven with the state of charge of the battery approaching a target state of charge. A proposed configuration of the hybrid vehicle changes the target state of charge of the battery to a special target state of charge that is lower than a basic target state of charge when the hybrid vehicle reaches a point that is a predetermined distance prior to a parking point (destination) where a parking time is expected to be longer than a predetermined time period, in a driving route of the hybrid vehicle, and returns the target state of charge to the basic target state of charge when the hybrid vehicle restarts from the parking point in a next trip (as described in, for example, JP 2017-81416A). The hybrid vehicle of this proposed configuration enables the state of charge of the battery at a restart from the parking point to be sufficiently lower than the basic target state of charge (to be close to the special target state of charge) by such control. This applies a load to the engine and enhances the charging (cold charging) efficiency of the battery in an engine drive (cold drive) serving to warm up the engine.

SUMMARY

In this hybrid vehicle, the parking point where the parking time is expected to be longer than the predetermined time period may be a destination set by the user or a destination estimated by a vehicle exterior system such as a cloud server. There is a difference in reliable accuracy (possibility that the vehicle is actually parked) between the former case and the latter case. The former case is likely to perform the more efficient charge discharge control of the battery, compared with the latter case. Employing an identical value for the special target state of charge in both the former case and the latter case may result in inappropriate control.

A hybrid vehicle and a control device mounted thereon of the present disclosure mainly aims to enable control of reducing the state of charge of a power storage device to be performed more appropriately.

In order to achieve the above primary object, the hybrid vehicle and a control device mounted thereon of the present disclosure employs the following configuration.

The present disclosure is directed to a hybrid vehicle. The hybrid vehicle includes an engine, a motor, a power storage device configured to transmit electric power to and from the motor and a control device configured to, when parking is expected at a predetermined point, perform state of charge reduction control in a current trip and to perform state of charge recovery control in a next trip. The state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine. When parking at the predetermined point is expected based on a destination that is not set by a user but that is estimated by a vehicle exterior system, the control device performs the state of charge reduction control by a first procedure, and when parking at the predetermined point is expected based on a destination that is set by the user, the control device performs the state of charge reduction control by a second procedure that is different from the first procedure.

When parking is expected at the predetermined point, the hybrid vehicle of this aspect performs the state of charge reduction control in the current trip to control the engine and the motor, such that the state of charge of the power storage device when parking is expected at the predetermined point is lower than the state of charge of the power storage device when parking is not expected at the predetermined point. The hybrid vehicle also performs the state of charge recovery control in the next trip to control the engine and the motor, such that the state of charge of the power storage device is recovered during operation of the engine. When parking at the predetermined point is expected based on the destination that is not set by the user but that is estimated by the vehicle exterior system, the state of charge reduction control is performed by the first procedure. When parking at the predetermined point is expected based on the destination that is set by the user, the state of charge reduction control is performed by the second procedure that is different from the first procedure. The destination that is set by the user has a higher reliability accuracy than the destination that is estimated by the vehicle exterior system (i.e., the vehicle is more likely to be actually parked at the predetermined point). The configuration that employs different procedures for the state of charge reduction control according to whether parking is expected at the predetermined point based on the destination that is estimated by the vehicle exterior system or parking is expected at the predetermined point based on the destination that is set by the user enables the state of charge reduction control to be performed more appropriately, compared with a configuration that employs an identical procedure.

The present disclosure is also directed to a control device mounted on a hybrid vehicle. The hybrid vehicle includes an engine, a motor, and a power storage device configured to transmit electric power to and from the motor. The control device is configured to, when parking is expected at a predetermined point, perform state of charge reduction control in a current trip and to perform state of charge recovery control in a next trip. The state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine. When parking at the predetermined point is expected based on a destination that is not set by a user but that is estimated by a vehicle exterior system, the control device performs the state of charge reduction control by a first procedure, and when parking at the predetermined point is expected based on a destination that is set by the user, the control device performs the state of charge reduction control by a second procedure that is different from the first procedure.

When parking is expected at the predetermined point, the control device of this aspect performs the state of charge reduction control in the current trip to control the engine and the motor, such that the state of charge of the power storage device when parking is expected at the predetermined point is lower than the state of charge of the power storage device when parking is not expected at the predetermined point. The control device also performs the state of charge recovery control in the next trip to control the engine and the motor, such that the state of charge of the power storage device is recovered during operation of the engine. When parking at the predetermined point is expected based on the destination that is not set by the user but that is estimated by the vehicle exterior system, the state of charge reduction control is performed by the first procedure. When parking at the predetermined point is expected based on the destination that is set by the user, the state of charge reduction control is performed by the second procedure that is different from the first procedure. The destination that is set by the user has a higher reliability accuracy than the destination that is estimated by the vehicle exterior system (i.e., the vehicle is more likely to be actually parked at the predetermined point). The configuration that employs different procedures for the state of charge reduction control according to whether parking is expected at the predetermined point based on the destination that is estimated by the vehicle exterior system or parking is expected at the predetermined point based on the destination that is set by the user enables the state of charge reduction control to be performed more appropriately, compared with a configuration that employs an identical procedure.

DESCRIPTION OF EMBODIMENTS

The following describes some aspects of the disclosure with reference to embodiments.

Figure 1:
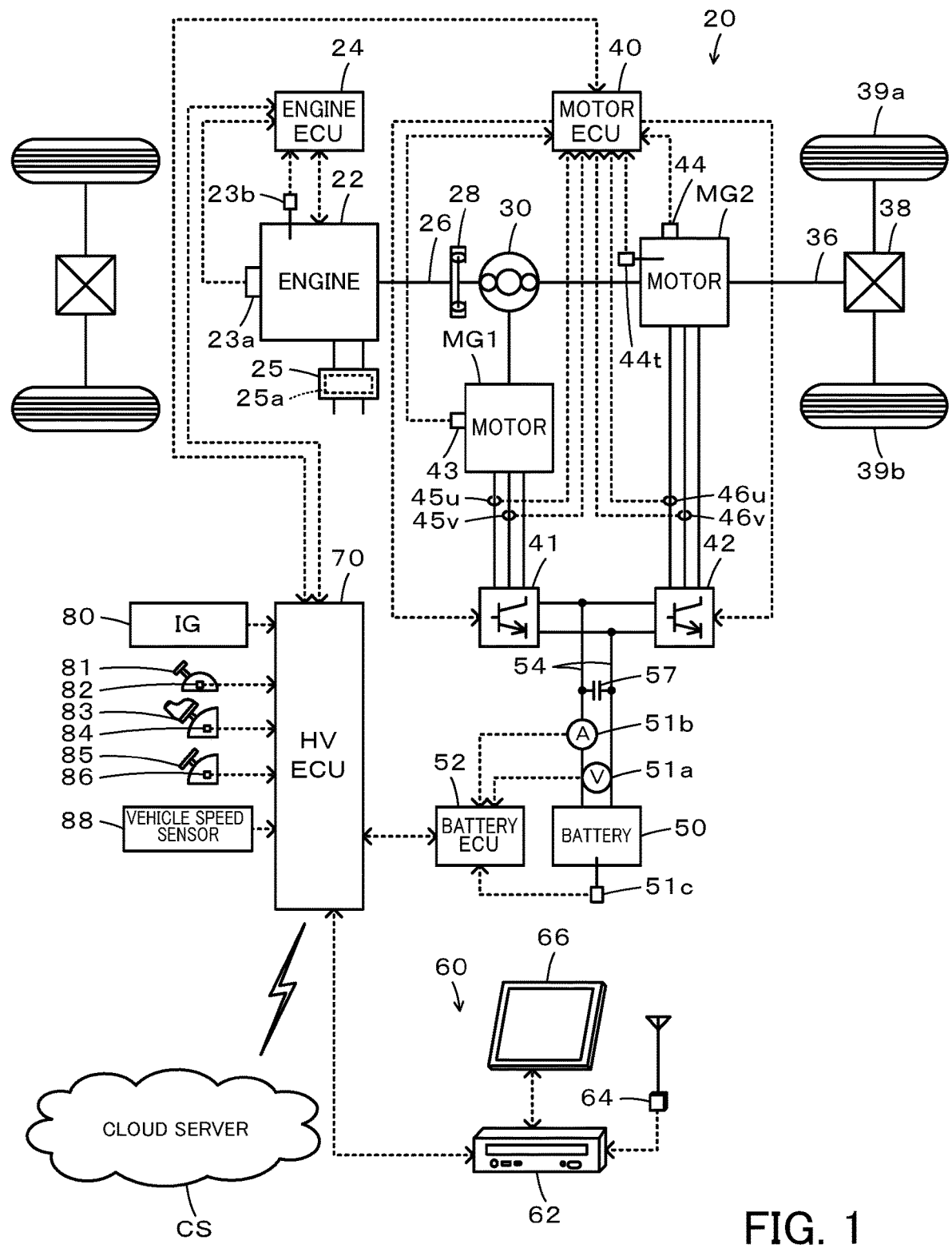
FIG. 1 is a configuration diagram illustrating the schematic configuration of a hybrid vehicle according to an embodiment of the present disclosure.

FIG. 1 is a configuration diagram illustrating the schematic configuration of a hybrid vehicle 20 according to an embodiment of the present disclosure. As illustrated, the hybrid vehicle 20 of the embodiment includes an engine 22, a planetary gear 30, motors MG1 and MG2, inverters 41 and 42, a battery 50 as a power storage device, a vehicle-mounted navigation system 60, and a hybrid electronic control unit (hereinafter referred as "HVECU") 70.

The engine 22 is configured as an internal combustion engine that outputs power using, for example, gasoline or light oil as a fuel and is connected with a carrier of the planetary gear 30 via a damper 28. An exhaust emission control device 25 filled with a catalyst 25a for exhaust emission control of the engine 22 is provided in an exhaust system of the engine 22. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23a configured to detect the rotational position of a crankshaft 26 of the engine 22 and a cooling water temperature Tw from a water temperature sensor 23b configured to detect the temperature of cooling water of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23a, while estimating a temperature Tc of the catalyst 25a (catalyst temperature Tc), based on, for example, the cooling water temperature Tw input from the water temperature sensor 23b.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to respectively drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2, phase currents Iu1, Iv1, Iu2 and Iv2 from current sensors 45u, 45v, 46u and 46v configured to detect electric currents flowing in the respective phases of the motors MG1 and MG2, and a temperature tm2 from a temperature sensor 44$t$ configured to detect the temperature of the motor MG2, are input into the motor ECU 40 via the input port. The motor ECU 40 outputs via the output port, for example, switching control signals to the plurality of switching elements included in the respective inverters 41 and 42. The motor ECU 40 is connected with the HVECU 70 via the respective communication ports. The motor ECU 40 calculates electrical angles θe1 and θe2, angular velocities ωm1 and ωm2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51$a$ placed between terminals of the battery 50, an electric current Ib of the battery 50 from a current sensor 51$b$ mounted to an output terminal of the battery 50, and a temperature Tb of the battery 50 from a temperature sensor 51$c$ mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51$b$. The battery ECU 52 also calculates an input limit Win and an output limit Wout, based on the calculated state of charge SOC and the temperature Tb of the battery 50 input from the temperature sensor 51$c$. The state of charge SOC denotes a ratio of the capacity of electric power dischargeable from the battery 50 to the overall capacity of the battery 50. The input limit Win and the output limit Wout denote an allowable charging power and an allowable discharging power that are chargeable into and dischargeable from the battery 50. For example, a procedure employable to determine the input limit Win and the output limit Wout may set base values Wintmp and Wouttmp of the input limit Win and the output limit Wout, based on the temperature Tb of the battery 50, set correction factors kin and kout, based on the state of charge SOC of the battery 50, and respectively multiply the base values Wintmp and Wouttmp by the correction factors kin and kout to set the products as the input limit Win and the output limit Wout. More specifically, the output limit Wout of the battery 50 is set to decrease with an increase in deviation of the temperature Tb of the battery 50 from an allowable temperature range to the higher temperature or to the lower temperature and is also set to decrease with a decrease in state of charge SOC of the battery 50. The input limit Win of the battery 50 is set to increase (i.e., to decrease as an absolute value) with an increase in deviation of the temperature Tb of the battery from the allowable temperature range to the higher temperature or to the lower temperature and is also set to increase (i.e., to decrease as an absolute value) with an increase in state of charge SOC of the battery 50.

The vehicle-mounted navigation system 60 includes a main body 62 provided with a built-in storage medium such as a hard disk drive, in which map information and the like are stored, and with a built-in controller having input/output ports and a communication port; a GPS antenna 64 provided to receive information regarding the current location of the own vehicle; and a touch panel display 66 configured to display the information regarding the current location of the own vehicle, an estimated driving route to a destination, and the like and to allow the user to enter various instructions. The map information is stored in the form of a database and includes service information (for example, tourism information and parking places) and road information of predetermined respective driving intervals (for example, intervals between traffic lights and intervals between intersections). The road information includes distance information, road width information, number of lanes information, district information (urban or suburban), road type information (general road, expressway, toll road), slope information, legal speed limits, and the number of signals. The vehicle-mounted navigation system 60 is connected with the HVECU 70 via the respective communication ports.

When the user operates the display 66 to set a destination, this vehicle-mounted navigation system 60 sets an estimated driving route from the current location of the vehicle to the destination, based on the map information, the current location of the own vehicle and the user's set destination, displays the set estimated driving route on the display 66, and performs route guidance.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40, the battery ECU 52 and the vehicle-mounted navigation system 60 via the respective communication ports as described above. The HVECU 70 is also configured to be communicable with a cloud server CS by wireless communication.

The cloud server CS is configured to be communicable with respective vehicles including the hybrid vehicle 20 by wireless communication and has driving history information of the respective vehicles accumulated therein. The driving history information includes, for example, a parking position, the date and time of parking, and a parking time. In the description below, a parking having the parking time longer than a predetermined time period T1 (for example, five hours, six hours or seven hours) is called "long time parking", and a parking having the parking time equal to or shorter than the predetermined time period T1 is called "short time parking". A point of the long time parking in a past trip is called "long time parking point", and a point of the short time parking in a past trip is called "short time parking point". When a certain point corresponds to both the long time parking point and the short time parking point, the certain point may be set as either the long time parking point or the short time parking point according to the day of the week and the time of day or may be set as either the long time parking point or the short time parking point according to the average parking time or the like. The predetermined time period T1 is determined, for example, as a time period required to sufficiently cool down the engine 22 and the catalyst 25a. The predetermined time period T1 may be a fixed time or may be a variable time that may be varied according to the ambient temperature or the like.

The cloud server CS also estimates a destination (point of arrival) of a current trip with regard to each vehicle by referring to its long time parking points and short time parking points, based on the driving history information and a starting position of the current trip (starting point). For example, when the starting point is a point A (for example, the user's home) in the morning of a weekday, a point B (for example, the user's working place) is estimated as a destination. When the starting point is other than the point A in the afternoon of a weekday or in a weekend, the point A is estimated as a destination. When the starting point is the point A in the afternoon of a weekday or in a weekend, the destination cannot be estimated (destination is unknown).

The hybrid vehicle 20 of the embodiment having the above configuration may be driven in a hybrid drive mode (HV drive mode) with operation of the engine 22 or may be driven in a motor drive mode (EV drive mode) with no operation of the engine 22.

Figure 2:
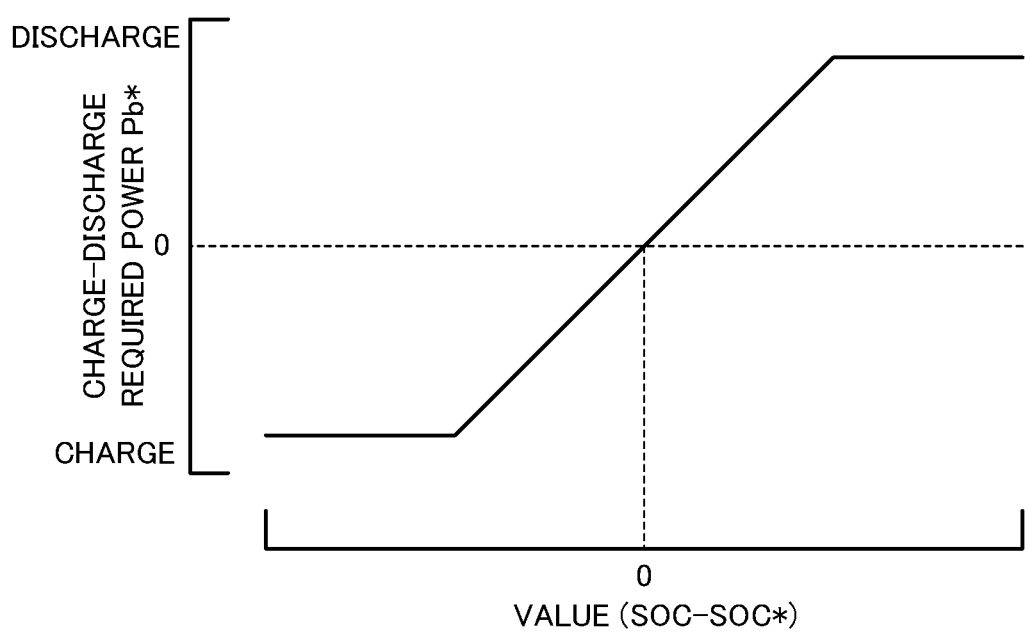
FIG. 2 is a diagram illustrating one example of a charge-discharge required power setting map.

In the HV drive mode, the HVECU 70 sets a required torque Td* that is required for the driveshaft 36, based on the accelerator position Acc and the vehicle speed V, and calculates a required power Pd* that is required for the driveshaft 36 by multiplying the set required torque Td* by a rotation speed Nd of the driveshaft 36 (rotation speed Nm2 of the motor MG2). The HVECU 70 subsequently sets a charge-discharge required power Pb* which the battery 50 requires (and which takes a positive value when the battery 50 is discharged), based on the state of charge SOC and a target state of charge SOC* of the battery 50. The target state of charge SOC* of the battery 50 is set according to a target state of charge setting routine described later. The charge-discharge required power Pb* of the battery 50 is set, such that a difference (SOC−SOC*) by subtracting the target state of charge SOC* from the state of charge SOC of the battery 50 becomes close to a value 0 (i.e., approaches zero). FIG. 2 is a diagram illustrating one example of a charge-discharge required power setting map. As illustrated, the charge-discharge required power Pb* of the battery 50 is set to a value 0 when the difference (SOC−SOC*) is a value 0, is set to a value having a tendency of increasing the absolute value in a positive range (i.e., range for discharging) with an increase in the difference (SOC−SOC*) when the difference (SOC−SOC*) is a positive value, and is set to a value having a tendency of increasing the absolute value in a negative range (i.e., range for charging) with a decrease in the difference (SOC−SOC*) when the difference (SOC−SOC*) is a negative value.

The HVECU 70 subsequently sets a required power Pe* that is required for the engine 22 by subtracting the charge-discharge required power Pb* of the battery 50 from the required power Pd*, and sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36 within the range of the input limit Win and the output limit Wout of the battery 50. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs operation control of the engine 22 (for example, intake air flow control, fuel injection control and ignition control), such that the engine 22 is operated with the target rotation speed Ne* and the target torque Te*. When receiving the torque commands Tm1* and Tm2* of the motors MG1 and MG2, the motor ECU 40 performs switching control of the plurality of switching elements included in the inverters 41 and 42, such that the motors MG1 and MG2 are driven with the torque commands Tm1* and Tm2*.

In this HV drive mode, it is determined that a stop condition of the engine 22 is met, upon satisfaction of all conditions, for example, a condition that the required power Pe* is lower than a stop reference value Pstop, a condition that neither a request for warming up the engine 22 nor a request for warming up the catalyst 25a is made, and a condition that no request is made for heating the passenger compartment using the engine 22 as a heat source. When the stop condition is met, the HVECU 70 stops operation of the engine 22 and shifts the drive mode to the EV drive mode. The request for warming up the engine 22 is made when the cooling water temperature Tw of the engine 22 is lower than a predetermined temperature Twref (for example, 70° C., 75° C. or 80° C.). The request for warming up the catalyst 25a is made when the temperature Tc of the catalyst 25a (catalyst temperature Tc) is lower than a predetermined temperature Tcref (for example, 350° C., 400° C. or 450° C.).

In the EV drive mode, the HVECU 70 sets the required torque Td* that is required for the driveshaft 36, based on the accelerator position Acc and the vehicle speed V. The HVECU 70 subsequently sets a value 0 to the torque command Tm1* of the motor MG1 and sets the torque command Tm2* of the motor MG2, such that the required torque Td* is output to the driveshaft 36 within the range of the input limit Win and the output limit Wout of the battery 50. The HVECU 70 then sends the torque commands Tm1* and Tm2* of the motors MG1 and MG2 to the motor ECU 40. The motor ECU 40 controls the inverters 41 and 42 as described above.

In this EV drive mode, it is determined that a start condition of the engine 22 is met, upon satisfaction of at least one of conditions, for example, a condition that the required power Pe* calculated in the same manner as that in the HV drive mode is equal to or higher than a start reference value Pstart, a condition that a request is made for warming up the engine 22 or for warming up the catalyst 25a, and that a request is made for heating the passenger compartment. When the start condition is met, the HVECU 70 starts the engine 22 and shifts the drive mode to the HV drive mode. The start reference value Pstart is preferably a larger value than the stop reference value Pstop by a certain margin (for example, about several kW), in order to suppress frequent changeover between the start and the stop of the engine 22 within a short time period.

Figure 3:
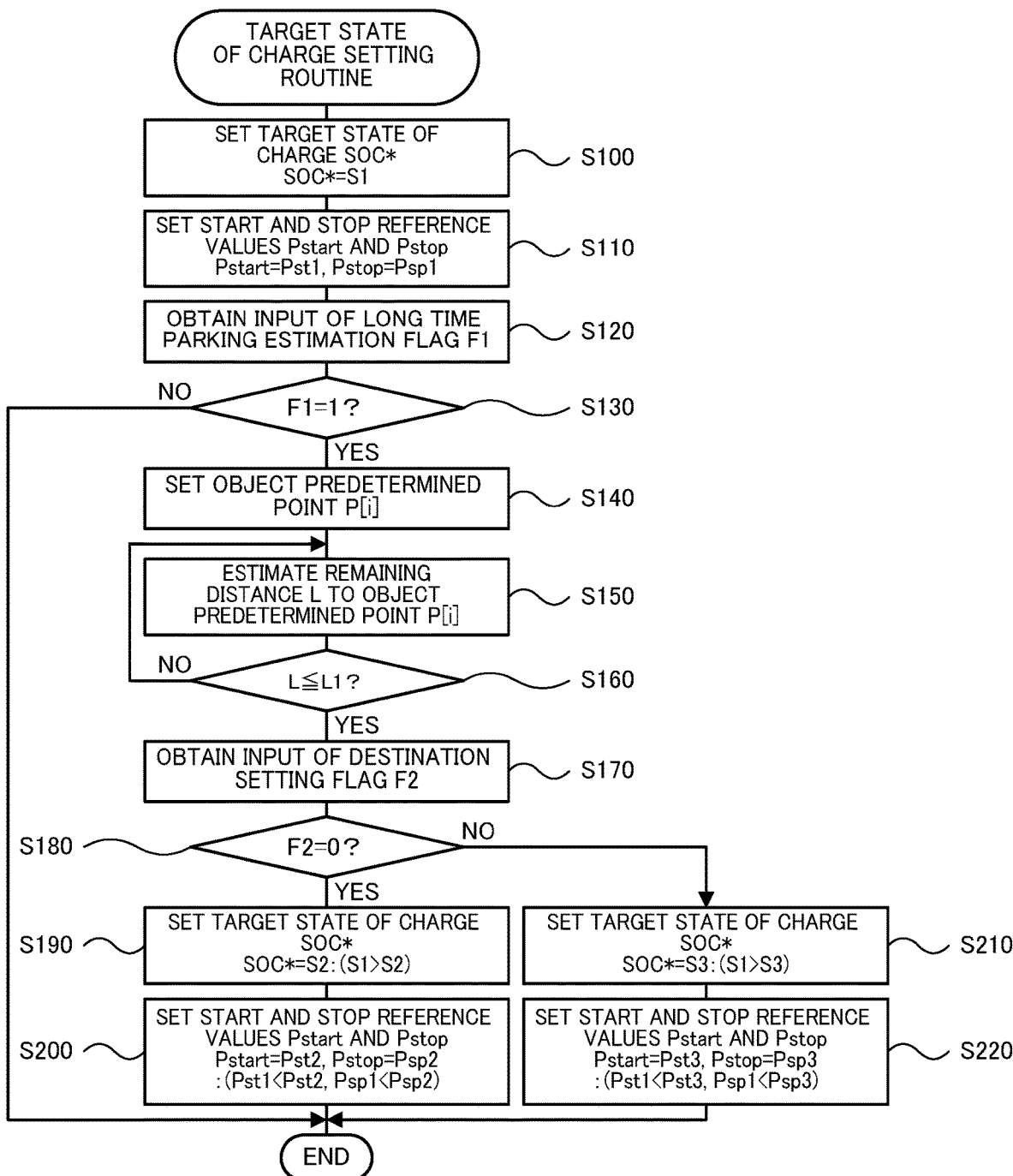
FIG. 3 is a flowchart showing one example of a target state of charge setting routine performed by HVECU.

The following describes the operations of the hybrid vehicle 20 of the embodiment having the above configuration and more specifically a series of processing to set the target state of charge SOC* of the battery 50. FIG. 3 is a flowchart showing one example of a target state of charge setting routine performed by the HVECU 70. This routine is performed at the start of each trip (when the ignition switch 80 is turned ON).

When the target state of charge setting routine shown in FIG. 3 is triggered, the HVECU 70 sets a value S1 to the target state of charge SOC* of the battery 50 (step S100), and respectively sets a value Pst1 and a value Psp1 to a start reference value Pstart and to a stop reference value Pstop (step S110). The value S1 used herein may be, for example, 58%, 60% or 62%. The value Pst1 used herein may be, for example, 9 kW, 10 kW or 11 kW. The value Psp1 used herein is a lower value than the value Pst1 by, for example, 1 kW, 2 kW or 3 kW. The value Pst1 and the value Psp1 may be fixed values or may be values based on the vehicle speed V (more specifically, values having a decreasing tendency with an increase in the vehicle speed V).

The HVECU 70 subsequently obtains the input of a long time parking estimation flag F1 (step S120) and checks the value of the input long time parking estimation flag F1 (step S130). The long time parking estimation flag F1 input here is set to a value 1 when a long time parking is expected at a predetermined point, while being set to a value 0 when the long time parking is not expected. The "predetermined point" denotes a position where there is a possibility of a long time parking and may be, for example, the user's home, the user's working place, a shopping mall, a leisure facility or an accommodation facility. The "predetermined points" include points set (registered) in advance prior to shipment of the vehicle, points set (registered) through the user's operations of the display 66, and long time parking points input from the cloud server CS by wireless communication.

The determination of whether a long time parking is expected at a predetermined point may be made as described below. When a destination is set by the user, this determination may be based on determination of whether the set destination is included in the predetermined points and based on determination of whether an expected arrival time to the set destination is included in the day of the week and the time of day when the long time parking is expected. When no destination is set by the user, on the other hand, this determination may be based on determination of whether a destination is estimated by the cloud server CS, based on determination of whether the estimated destination is included in the predetermined points, and based on determination of whether an expected arrival time to the estimated destination is included in the day of the week and the time of day when the long time parking is expected. A certain time period is required between the start of a trip to the user's setting of a destination. The processing of step S110 may accordingly be performed when a destination is set by the user, when a certain time period has elapsed, or the hybrid vehicle 20 is driven by a certain distance after the processing of step S100 is performed.

When the long time parking estimation flag F1 is equal to the value 0 at step S130, the HVECU 70 determines that along time parking is not expected at the predetermined point and terminates this routine. In this case, the target state of charge SOC* of the battery 50 is kept at the value S1 until the end of the current trip.

When the long time parking estimation flag F1 is equal to the value 1 at step S130, on the other hand, the HVECU 70 determines that a long time parking is expected at the predetermined point and sets either a destination set by the user or a destination estimated by the cloud server CS as an object predetermined point P[i] (step S140). Herein [i] represents a number corresponding to each place, such as the user's home, the user's working place, a shopping mall, a leisure facility, or an accommodation facility.

The HVECU 70 subsequently estimates a remaining distance L to the object predetermined point P[i], based on the current location, the destination and the map information (step S150) and compares the estimated remaining distance L with a predetermined distance L1 (for example, 3 km, 4 km or 5 km) (step S160). When the remaining distance L is longer than the predetermined distance L1, the HVECU 70 goes back to step S150. The HVECU 70 repeats the processing of steps S150 and S160 until the remaining distance L to the object predetermined point P[i] becomes equal to or shorter than the predetermined distance L1.

When it is determined at step S160 that the remaining distance L to the object predetermined point P[i] becomes equal to or shorter than the predetermined distance L1, the HVECU 70 obtains the input of a destination setting flag F2 (step S170) and checks the value of the input destination setting flag F2 (step S180). The destination setting flag F2 input here is set to a value 1 when a destination is set by the user (i.e., when a destination set by the user is the object predetermined point P[i]), while being set to a value 0 when no destination is set by the user (i.e., when a destination estimated by the cloud server CS is the object predetermined point P[i]).

When the destination setting flag F2 is equal to the value 0 at step S180, it is determined that no destination is set by the user (i.e., that a destination estimated by the cloud server CS is the object predetermined point P[i]). The HVECU 70 sets a value S2 that is lower than the value S1 to the target state of charge SOC* (step S190), sets a value Pst2 that is higher than the value Pst1 to the start reference value Pstart while setting a value Psp2 that is higher than the value Psp1 but is lower than the value Pst2 to the stop reference value Pstop (step S200), and then terminates this routine.

The value S2 used herein is a lower value than the value S1 by, for example, 8%, 10% or 12%. The value Pst2 used herein is a higher value than the value Pst1 by, for example, 2 kW, 3 kW or 4 kW. The value Psp2 is a lower value than the value Pst2 by, for example, 1 kW, 2 kW or 3 kW.

When the destination setting flag F2 is equal to the value 1 at step S180, on the other hand, it is determined that a destination is set by the user (i.e., that a destination set by the user is the object predetermined point P[i]). The HVECU 70 sets a value S3 that is lower than the value S1 to the target state of charge SOC* of the battery 50 (step S210), sets a value Pst3 that is higher than the value Pst1 to the start reference value Pstart while setting a value Psp3 that is higher than the value Psp1 but is lower than the value Pst3 to the stop reference value Stop (step S220), and then terminates this routine.

The value S3 is determined such as to decrease with a decrease in driving load in an estimated driving route, based on the estimated driving route to the destination (object predetermined point P[i]), after the remaining distance L to the destination becomes equal to or shorter than the predetermined distance L1. The value S3 used herein is a lower value than the value S1 by about several % to ten-odd %. The value Pst3 and the value Psp3 are determined such as to increase with a decrease in driving load in the estimated driving route, based on the estimated driving route to the destination. The value Pst3 used herein is a higher value than the value Pst1 by, for example, about several kW to 10 kW. The value Psp3 used herein is a lower value than the value Pst3 by, for example, 1 kW, 2 kW or 3 kW. The driving load in the estimated driving route to the destination is estimated by using, for example, driving information with regard to driving in the same estimated driving routine in the past (for example, an integrated value and a maximum value of the accelerator position Acc, an integrated value and a maximum value of the vehicle speed V, an integrated value and a maximum value of the required torque Td* of the driveshaft 36, a maximum value of the required power Pd* of the driveshaft 36, an integrated value and a maximum value of a road surface gradient θd, and a difference in elevation ΔH) and the map information (for example, an integrated value and a maximum value of the road surface gradient θd, and the difference in elevation ΔH) of the vehicle-mounted navigation system 60 and the cloud server CS. The driving information used herein may be not only driving information of the own vehicle stored in the HVECU 70 or the cloud server CS but driving information of other vehicles stored in the cloud server CS.

In such cases, when the remaining distance L to the object predetermined point P[i] becomes equal to or shorter than the predetermined distance L1 in the current trip, state of charge reduction control is performed to decrease the state of charge SOC of the battery 50 by changing the setting of the target state of charge SOC* of the battery 50 from the value S1 to the lower value S2 or to the lower value S3 and by changing the settings of the start reference value Pstart and the stop reference value Pstop from the values Pst1 and Psp1 to the higher values Pst2 and Psp2 or to the higher values Pst3 and Psp3. More specifically, the "state of charge reduction control" denotes controlling the engine 22 and the motors MG1 and MG2, such that the state of charge SOC of the battery 50 becomes close to the value S2 or to the value S3. Decreasing the target state of charge SOC* of the battery 50 is more likely to increase the charge discharge required power Pb* of the battery 50 (i.e., more likely to increase as the value for discharging), to decrease the output of the engine 22 and the power generation by the motor MG1, and to increase the power consumption of the motor MG2 in the HV drive mode. Increasing the start reference value Pstart and the stop reference value Pstop is more likely to shift the drive mode to the EV drive mode. As a result, this causes the state of charge SOC of the battery 50 to decrease to about the value S2 or to about the value S3.

State of charge recovery control is performed to recover the state of charge SOC of the battery 50 to about the value S1 in a next trip by setting the target state of charge SOC* of the battery 50 to the value S1 and respectively setting the values Pst1 and Psp1 to the start reference value Pstart and the stop reference value Pstop at start of the next trip. More specifically, the "state of charge recovery control" denotes controlling the engine 22 and the motors MG1 and MG2, such that the state of charge SOC of the battery 50 becomes close to the value S1 (in the next trip) after the state of charge reduction control is performed. Increasing (returning) the target state of charge SOC* of the battery 50 is more likely to decrease the charge discharge required power Pb* of the battery 50 (i.e., more likely to increase as the value for charging), to increase the output of the engine 22 and the power generation by the motor MG1, and to decrease the power consumption of the motor MG2 in the HV drive mode. Decreasing (returning) the start reference value Pstart and the stop reference value Pstop is more likely to shift the drive mode to the HV drive mode. As a result, this causes the state of charge SOC of the battery 50 to recover (increase) to about the value S1.

Figure 4:
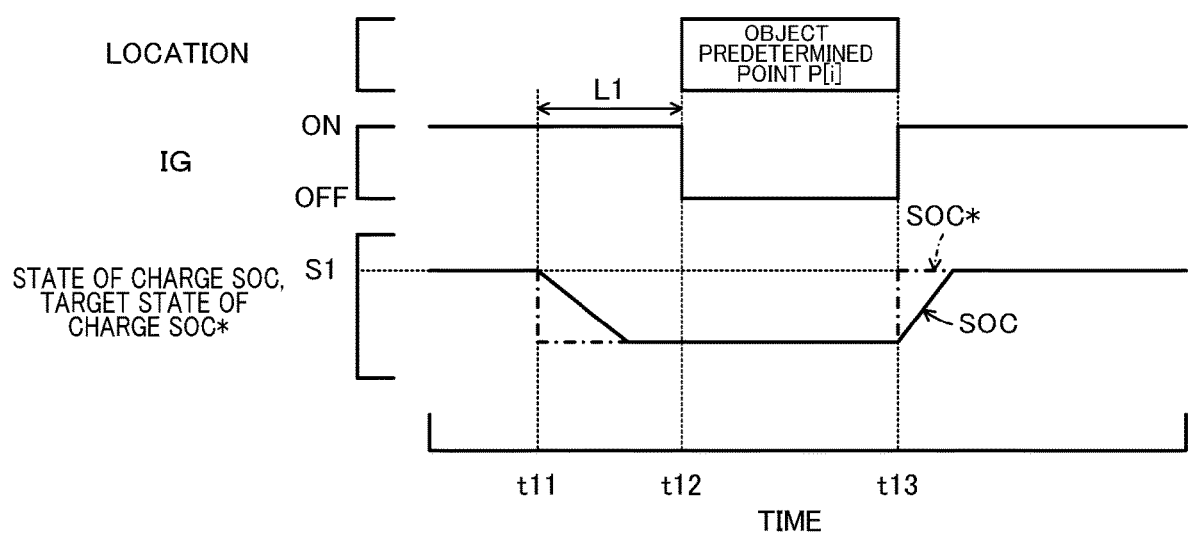
FIG. 4 is a diagram illustrating one example of performing the state of charge reduction control and the state of charge recovery control.

FIG. 4 is a diagram illustrating one example of performing the state of charge reduction control and the state of charge recovery control. When the remaining distance L to the object predetermined point P[i] becomes equal to or shorter than the predetermined distance L1 (at time t11) in a current trip, the state of charge reduction control is performed (to change the target state of charge SOC* of the battery 50 from the value S1 to the value S2 or to the value S3). This reduces the state of charge SOC of the battery 50 (to be close to the value S2 or to be close to the value S3) at the end of the current trip (at time t12) and at the start of a next trip (at time t13). The state of charge recovery control is performed in the next trip (at and after time t13) (to set the value S1 to the target state of charge SOC* of the battery 50). This recovers the state of charge SOC of the battery 50 (to be close to the value S1).

Compared with a configuration that does not perform the state of charge reduction control in a current trip and accordingly provides the high state of charge SOC of the battery 50 (to be close to the value S1) at the start of a next trip, this series of controls reduces the charge-discharge required power Pb* of the battery 50 (i.e., increases as the value for charging) and thereby increases the required power Pe* to increase the output of the engine 22 during operation of the engine 22 in response to a request for heating the passenger compartment, a request for warming up the engine 22 and a request for warming up the catalyst 25a in the next trip. This series of controls accordingly enables the battery 50 to be charged, while operating the engine 22 at an operation point of high efficiency, ensuring fully sufficient heat for heating, and accelerating the warming-up of the engine 22 and the warming-up of the catalyst 25a. As a result, this improves the energy efficiency.

Moreover, according to the embodiment, the target state of charge SOC* of the battery 50, the start reference value Pstart and the stop reference value Pstop used for the state of charge reduction control are set according to whether a destination is set by the user. This enables the state of charge reduction control to be performed more appropriately. This is based on that the destination set by the user has a higher reliable accuracy than the destination estimated by the cloud server CS (i.e., the higher possibility that the vehicle is actually parked at the predetermined point). When a destination is set by the user, the target state of charge SOC* of the battery 50, the start reference value Pstart and the stop reference value Pstop used for the state of charge reduction control are set based on the estimated driving route to the destination. This enables the state of charge reduction control to be performed more appropriately according to the estimated driving route. More specifically, the lower driving load in the estimated driving route sets the lower value to the target state of charge SOC* of the battery 50 and sets the higher values to the start reference value Pstart and the stop reference value Pstop. Accordingly, at a high driving load in the estimated driving route, the state of charge reduction control is performed to provide a relatively high state of charge SOC of the battery 50. This suppresses a reduction in output limit Wout of the battery 50 in a current trip and in a next trip. This accordingly suppresses the power limitation of the motor MG2 and suppresses deterioration of the power performance. At a low driving load in the estimated driving route, on the other hand, the estate of charge reduction control is performed to provide a relatively low state of charge SOC of the battery 50. This increases the output of the engine 22 in the course of the state of charge recovery control in a next trip and improves the energy efficiency.

As described above, when a long time parking is expected at the destination (object predetermined point P[i]), the hybrid vehicle 20 of the embodiment performs the state of charge reduction control by different procedures, based on whether no destination is set by the user (i.e., a destination estimated by the cloud server CS is the object predetermined point P[i]) or a destination is set by the user (i.e., a destination set by the user is the object predetermined point P[i]). This enables the state of charge reduction control to be performed more appropriately. Additionally, in the latter case, the hybrid vehicle 20 of the embodiment performs the state of charge reduction control with setting the target state of charge SOC* of the battery 50, the start reference value Pstart and the stop reference value Pstop based on the estimated driving route to the destination. This enables the state of charge reduction control to be performed more appropriately according to the estimated driving route.

In the case where a long time parking is expected at the destination (object predetermined point P[i]), when a destination is set by the user (i.e., when a destination set by the user is the object predetermined point P[i]), the hybrid vehicle 20 of the embodiment performs the state of charge reduction control with setting the target state of charge SOC* of the battery 50, the start reference value Pstart and the stop reference value Pstop based on the driving load in the estimated driving route to the destination. A modification may perform the state of charge reduction control by any other procedure that is different from the procedure employed when no destination is set by the user (i.e., when a destination estimated by the cloud server CS is the object predetermined point P[i]). For example, a modification may perform the state of charge reduction control with setting the target state of charge SOC* of the battery 50, the start reference value Pstart and the stop reference value Pstop, irrespective of the driving load in the estimated driving route.

When a long time parking is expected at the destination (object predetermined point P[i]), the hybrid vehicle 20 of the embodiment performs the state of charge reduction control with changing over the target state of charge SOC* of the battery 50, based on whether no destination is set by the user (i.e., a destination estimated by the cloud server CS is the object predetermined point P[i]) or a destination is set by the user (i.e., a destination set by the user is the object predetermined point P[i]). The subject of such a changeover is, however, not limited to the target state of charge SOC* of the battery 50. A modification may perform the state of charge reduction control with changing over a starting ratio SOCst that denotes the state of charge SOC for starting the engine 22 to forcibly charge the battery 50.

When a long time parking is expected at the destination (object predetermined point P[i]), the hybrid vehicle 20 of the embodiment performs the state of charge reduction control with changing over the start reference value Pstart and the stop reference value Pstop with regard to the required power Pe*, based on whether no destination is set by the user (i.e., a destination estimated by the cloud server CS is the object predetermined point P[i]) or a destination is set by the user (i.e., a destination set by the user is the object predetermined point P[i]). The subject of such a changeover is, however, not limited to the start reference value Pstart or the stop reference value Pstop but may be any other start and stop reference values relating to the driving output of the vehicle. A modification may perform the state of charge reduction control with changing over, for example, start and stop reference values with regard to the accelerator position Acc, start and stop reference values with regard to the vehicle speed V, start and stop reference values with regard to the required torque Td*, start and stop reference values with regard to the required power Pd*, start and stop reference values with regard to the actual torque Td of the driveshaft 36, start and stop reference values with regard to the actual power Pd of the driveshaft 36, or start and stop reference values with regard to the actual power Pe of the engine 22.

When a long time parking is expected at the destination (object predetermined point P[i]), the hybrid vehicle 20 of the embodiment performs the state of charge reduction control with changing over the target state of charge SOC* of the battery 50, the start reference value Pstart and the stop reference value Pstop, based on whether no destination is set by the user (i.e., a destination estimated by the cloud server CS is the object predetermined point P[i]) or a destination is set by the user (i.e., a destination set by the user is the object predetermined point P[i]). A modification may perform the state of charge reduction control with changing over only one of the target state of charge SOC* of the battery 50, the start reference value Pstart and the stop reference value Pstop.

In the hybrid vehicle 20 of the embodiment, the vehicle-mounted navigation system 60 is used to set a destination, to set an estimated driving route from the current location of the own vehicle to the destination and to perform route guidance of the estimated driving route. According to a modification, a personal digital assistance (for example, a smartphone or a tablet computer) configured to be communicable with the HVECU 70 by wireless communication may be used to set a destination, to set an estimated driving route from the current location of the own vehicle to the destination and to perform route guidance of the estimated driving route. In this modification, the target state of charge setting routine of FIG. 3 may obtain the input of a destination from the personal digital assistance, instead of obtaining the input of a destination from the vehicle-mounted navigation system 60.

The hybrid vehicle 20 of the embodiment is provided with the vehicle-mounted navigation system 60. A hybrid vehicle of a modification may not be provided with the vehicle-mounted navigation system 60.

The hybrid vehicle 20 of the embodiment is a motor vehicle configured without a connector or the like that is connectable with an external power source or more specifically a motor vehicle configured not to perform external charging that charges the battery 50 using electric power from an external power source. The present disclosure may, however, be applied to a motor vehicle that is capable of performing external charging. In this modification, it is preferable to set (register) a point where external charging is not expected to be performed, as the predetermined point. When external charging is expected to be performed during long time parking at the predetermined point, there is little need to perform the state of charge reduction control prior to the long time parking.

The hybrid vehicle 20 of the embodiment uses the battery 50 as the power storage device. The power storage device used may be a capacitor, in place of the battery 50.

The hybrid vehicle 20 of the embodiment includes the engine ECU 24, the motor ECU 40, the battery ECU 52 and the HVECU 70. At least two of these ECUs may be configured by a single electronic control unit.

Figure 5:
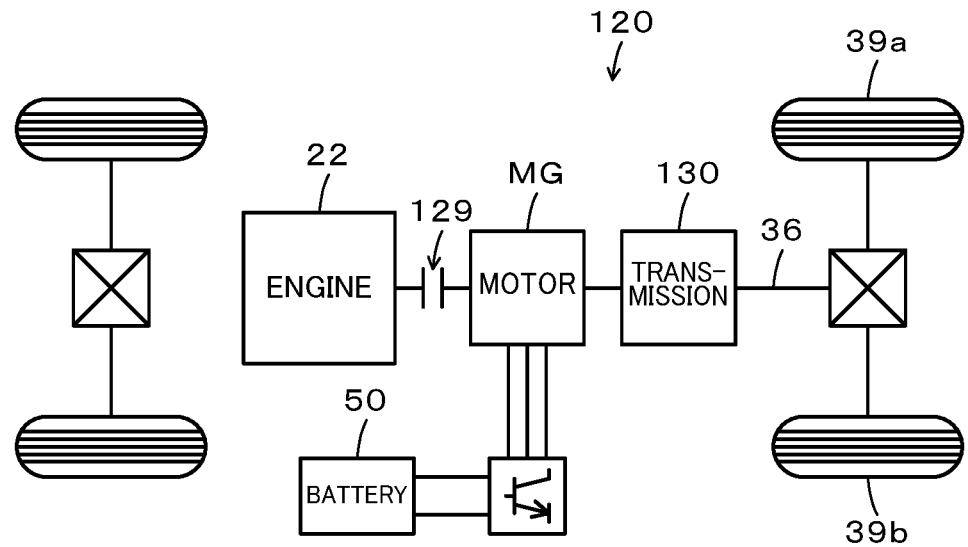
FIG. 5 is a configuration diagram illustrating the schematic configuration of a hybrid vehicle according to a modification and FIG. 6 is a configuration diagram illustrating the schematic configuration of a hybrid vehicle according to another modification.
Figure 6:
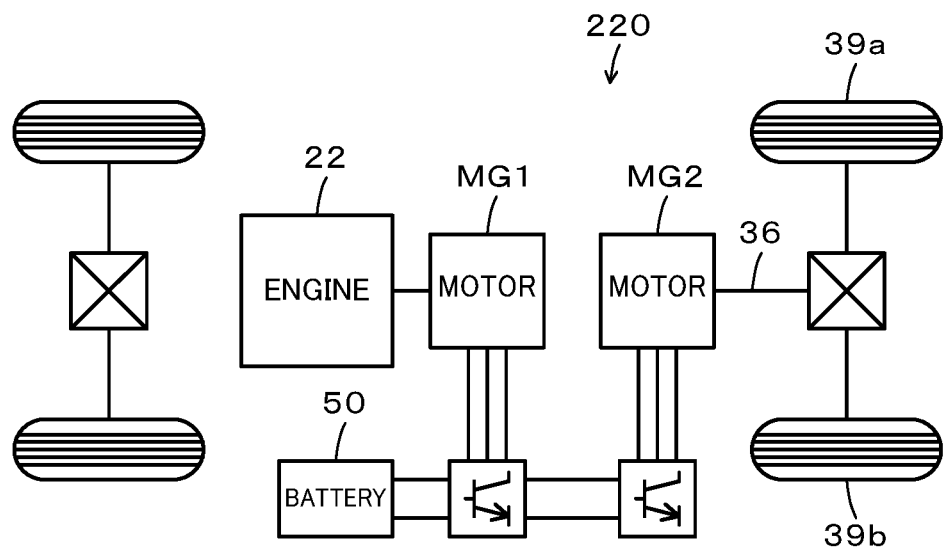

The hybrid vehicle 20 of the embodiment is configured such that the engine 22 and the motor MG1 are connected via the planetary gear 30 with the driveshaft 36 which is coupled with the drive wheels 39a and 39b, that the motor MG2 is connected with the driveshaft 36, and that the battery 50 is connected with the motors MG1 and MG2 via the power lines. The present disclosure may, however, be applicable to a one-motor hybrid vehicle configured such that a motor MG is connected via a transmission 130 with a driveshaft 36 which is coupled with drive wheels 39a and 39b, that an engine 22 is connected with the motor MG via a clutch 129, and that a battery 50 is connected with the motor MG via power lines, like a hybrid vehicle 120 of a modification shown in FIG. 5. The present disclosure may also be applicable to a series hybrid vehicle configured such that a motor MG1 for power generation is connected with an engine 22, that a motor MG2 for driving is connected with a driveshaft 36 which is coupled with drive wheels 39a and 39b, and that a battery 50 is connected with the motors MG1 and MG2 via power lines, like a hybrid vehicle 220 of another modification shown in FIG. 6.

The embodiment describes the application of the present disclosure to the hybrid vehicle 20. The present disclosure may also be applied to a control device mounted on the hybrid vehicle 20. In this aspect, the HVECU 70, the engine ECU 24, the motor ECU 40 and the battery ECU 52 correspond to the "control device".

In the hybrid vehicle of this aspect, the control device may control the state of charge of the power storage device to become equal to a first ratio, when the state of charge reduction control is not performed. The control device may control the state of charge of the power storage device to become equal to a second ratio that is lower than the first ratio, when the state of charge reduction control is performed by the first procedure. The control device may control the state of charge of the power storage device to become equal to a third ratio that is lower than the first ratio, when the state of charge reduction control is performed by the second procedure. This configuration enables the state of charge reduction control to be performed more appropriately by more adequately setting the target state of charge of the power storage device. In this case, the third ratio may be set, based on an estimated driving route to a destination. In this aspect, the third ratio may be set to decrease with a decrease in driving load in the estimated driving route. This configuration enables the third ratio to be determined more appropriately.

In the hybrid vehicle of this aspect, the control device may set first values to start and stop reference values of the engine relating to a driving output of the hybrid vehicle, when the state of charge reduction control is not performed. The control device may set second values that are higher than the first values to the start and stop reference values, when the state of charge reduction control is performed by the first procedure. The control device may set third values that are higher than the first values to the start and stop reference values, when the state of charge reduction control is performed by the second procedure. The "start and stop reference values" used herein may be, for example, start and stop reference values with regard to an accelerator position, a vehicle speed, a required output (torque or power), or an actual output (torque or power). This configuration enables the state of charge reduction control to be performed more appropriately by more adequately setting the start and stop reference values. In this case, the third values may be set, based on an estimated driving route to a destination. In this aspect, the third values may be set to increase with a decrease in driving load in the estimated driving route. This configuration enables the third values to be determined more appropriately.

In the hybrid vehicle of this aspect, the hybrid vehicle may be a motor vehicle configured not to perform external charging that charges the power storage device using electric power from an external power supply. Further, the hybrid vehicle may be a motor vehicle configured to be capable of performing external charging that charges the power storage device using electric power from an external power supply, and the predetermined point may be a point where the external charging is not expected to be performed. When external charging is expected to be performed during parking at the predetermined point, there is little need to perform the state of charge reduction control prior to the parking at the predetermined point.

The following describes the correspondence relationship between the primary components of the embodiment and the primary components of the disclosure described in Summary. The engine 22 of the embodiment corresponds to the "engine", the motor MG1 and MG2 correspond to the "motor", the battery 50 corresponds to the "power storage device", and the HVECU 70, engine ECU 24, motor ECU 40 and battery ECU 52 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and control device mounted thereon and so on.

The invention claimed is:

1. A hybrid vehicle, comprising:
an engine;
a motor;
a power storage device configured to transmit electric power to and from the motor; and
a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, wherein
when parking at the predetermined point is expected based on a destination that is not set by a user but that is estimated by a vehicle exterior system, the control device performs the state of charge reduction control by a first procedure, and
when parking at the predetermined point is expected based on a destination that is set by the user, the control device performs the state of charge reduction control by a second procedure that is different from the first procedure.

2. The hybrid vehicle according to claim 1,
wherein the control device controls the state of charge of the power storage device to become equal to a first ratio, when the state of charge reduction control is not performed,
the control device controls the state of charge of the power storage device to become equal to a second ratio that is lower than the first ratio, when the state of charge reduction control is performed by the first procedure, and
the control device controls the state of charge of the power storage device to become equal to a third ratio that is lower than the first ratio, when the state of charge reduction control is performed by the second procedure.

3. The hybrid vehicle according to claim 2,
wherein the third ratio is set, based on an estimated driving route to a destination.

4. The hybrid vehicle according to claim 1,
wherein the control device sets first values to start and stop reference values of the engine relating to a driving output of the hybrid vehicle, when the state of charge reduction control is not performed,
the control device sets second values that are higher than the first values to the start and stop reference values, when the state of charge reduction control is performed by the first procedure, and
the control device sets third values that are higher than the first values to the start and stop reference values, when the state of charge reduction control is performed by the second procedure.

5. The hybrid vehicle according to claim 4,
wherein the third values are set, based on an estimated driving route to a destination.

6. The hybrid vehicle according to claim 1,
the hybrid vehicle being a motor vehicle configured not to perform external charging that charges the power storage device using electric power from an external power supply.

7. The hybrid vehicle according to claim 1,
the hybrid vehicle being a motor vehicle configured to be capable of performing external charging that charges the power storage device using electric power from an external power supply, and
the predetermined point is a point where the external charging is not expected to be performed.

8. A control device mounted on a hybrid vehicle, the hybrid vehicle comprising an engine, a motor, and a power storage device configured to transmit electric power to and from the motor,
the control device being configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine,
when parking at the predetermined point is expected based on a destination that is not set by a user but that is estimated by a vehicle exterior system, the control device performing the state of charge reduction control by a first procedure, and
when parking at the predetermined point is expected based on a destination that is set by the user, the control device performing the state of charge reduction control by a second procedure that is different from the first procedure.

* * * * *